United States Patent [19]

Ichikawa

[11] Patent Number: 4,477,808
[45] Date of Patent: Oct. 16, 1984

[54] RADIO PAGING RECEIVER HAVING STORED MESSAGE PROTECTION MEANS

[75] Inventor: Yoshio Ichikawa, Tokyo, Japan

[73] Assignee: Nippon Electric Co., Ltd., Tokyo, Japan

[21] Appl. No.: 462,867

[22] Filed: Feb. 1, 1983

[30] Foreign Application Priority Data

Feb. 1, 1982 [JP] Japan .................................... 57-13343

[51] Int. Cl.³ ...................... H04Q 7/00; H04M 11/00; G08B 5/22; H04B 1/16
[52] U.S. Cl. ............................ 340/825.44; 179/2 EC; 455/38
[58] Field of Search ...................... 340/825.44, 825.48; 455/38; 179/2 EB, 2 EC

[56] References Cited

U.S. PATENT DOCUMENTS

| | | | |
|---|---|---|---|
| 4,249,165 | 2/1981 | Mori | 340/825.44 |
| 4,336,524 | 6/1982 | Levine | 340/311.1 |
| 4,383,257 | 5/1983 | Giallanza et al. | 340/825.44 |
| 4,385,295 | 5/1983 | Willard et al. | 340/825.44 |

Primary Examiner—Donald J. Yusko
Attorney, Agent, or Firm—Sughrue, Mion, Zinn, Macpeak & Seas

[57] ABSTRACT

A radio paging receiver is provided in which messages are continuously written into a first memory for subsequent display. A second memory is used to selectively prevent the erasure of messages written into the first memory when the first memory capacity has been exceeded.

10 Claims, 11 Drawing Figures

RADIO PAGING RECEIVER HAVING STORED MESSAGE PROTECTION MEANS

BACKGROUND OF THE INVENTION

The present invention relates to a radio paging receiver for use in radio paging.

Owing to the remarkable progress of circuit integration technology in recent years, more compact radio paging receivers of a greater multiplicity of functions and of smaller power consumption have come to be developed. One aspect of this increase in functional multiplicity is the recent addition of message signals to the previous service of sending the selective calling or paging signal (a specific number assigned to each subscriber) alone. Furthermore, to cope with the expansion of the demand spectrum and to increase the reliability of communication, these paging and message signals are now digitized.

Meanwhile, the display of a message signal is achieved, after the receipt of said paging signal, upon actuation of the function to indicate the receipt of the message signal. There are provided within a receiver a plurality of message signal memory circuits, because the subscriber may be paged very frequently or may not promptly respond to every message signal received. The message signals stored in these memory circuits can be read out by a variety of methods. For instance, where there are n memory circuits, n read-out switches may be provided to enable the subscriber to operate in one action the switch corresponding to the particular memory circuit in which the desired message signal is stored. Alternatively, there may be one read-out switch, which the subscriber will have to operate n times at the maximum to have the desired message signal read out. A radio paging receiver having one of such functions, which indicates the receipt of and stores every message signal received, is very convenient because it allows a long enough time for its bearer to take a plurality of actions.

However, the number of memory circuits is limited by elements of software and, accordingly, if more message signals than the memory circuits are received, the early signal or signals will have to be erased in the order of arrival. Thus, even if one of the plurality of memorized signals contains important information and has to be kept for a long period, it may have to be indiscriminately erased upon arrival of an extra message or messages. Normally, most of the message signals received can be promptly responded to and therefore erased soon, and keeping obsolete messages would unnecessarily complicate the subsequent procedures. With the aforementioned setup which requires the read-out switch to be operated as many times as the desired memory circuit calls for, for instance, there would be a corresponding increase in the required number of switching actions, the number of switches would have to be correspondingly greater. Moreover, a greater number of memory circuits means a correspondingly higher cost.

SUMMARY OF THE INVENTION

An object of the present invention therefore is to provide an economical radio paging receiver which is free from the above stated disadvantages of conventional such receivers, and of which the switch operation is simplified and the number of memory circuits is reduced by enabling only important messages to be stored as long as they are needed, regardless of the memory capacity, and unimportant messages to be sequentially erased as the memory circuits overflow.

According to the invention, there is provided a radio paging receiver comprising: means for receiving and demodulating a carrier wave modulated with paging and message signals to provide demodulated paging and message signals; means for detecting, out of said demodulated paging signals, the paging signal assigned to said radio paging receiver to provide a detection signal; means responsive to said detection signal for generating an alert signal; first memory means for storing a plurality of said demodulated message signals; second memory means for preventing from erasure and storing at least one of the message signals stored in said first memory means; display means for displaying at least one of the message signals stored in said first and second memory means; and display control means connected to said first and second memory means and said display means for selectively providing said display means with at least one of the message signals stored in said first and second memory means.

BRIEF DESCRIPTION OF THE DRAWINGS

Other objects, features and advantages of the present invention will be more apparent from the detailed description hereunder taken in conjunction with the accompanying drawings, wherein:

FIGS. 4(A)–4(H) are waveform time charts for describing the signal receiving operation of the decoder illustrated in FIG. 3;

FIGS. 5(I)–5(N) are waveform time charts for describing the message information reading and message information protecting operation of the decoder illustrated in FIG. 3;

DESCRIPTION OF THE PREFERRED EMBODIMENTS

Figure 1:
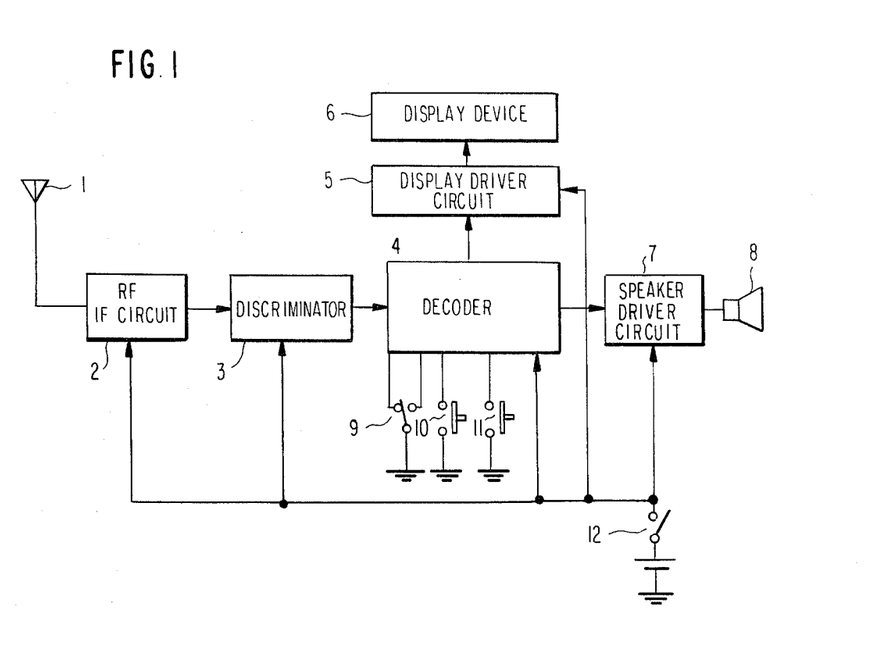
FIG. 1 is a schematic block diagram of the radio paging receiver according to the present invention.

Referring to FIG. 1, a radio carrier wave received by an antenna 1, after being respectively amplified and frequency-converted by a radio frequency-intermediate frequency (RF-IF) circuit 2, is demodulated by a discriminator 3. The demodulated signal is subjected to decision by a decoder 4 as to whether or not it is the selective calling or paging signal assigned to the receiver and, if it is, an output pulse is given to a speaker driver circuit 7 to let the bearer of the receiver know, by sounding a loud-speaker 8, that the paging signal has been received. At the same time, ensuing message information is stored in a memory in the decoder 4. If, at this time, a memory read-out switch 10 is closed, one out of the messages then stored is supplied by way of a display driver circuit 5 to a display device 6.

While messages stored in the memory within the decoder 4 are erased in the order of their entry as the memory overflows, a specific message can be protected from erasure by operating a memory protect switch 11 or the switch 10, as will be described in further detail hereunder. The message thereby protected will never be erased unless a power switch 12 is turned off or another message is protected by again operating the switch 10 or 11. A display selector switch 9 permits selection between the displaying of only stored messages or the displaying of the protected message.

Figure 2:
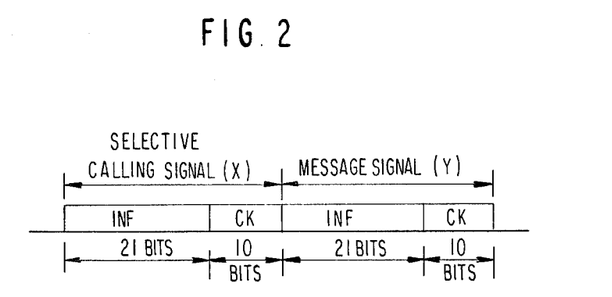
FIG. 2 shows the format of the calling signal to be received by the receiver according to the present invention.

Referring now to FIG. 2, section X shows a selective calling signal assigned to each receiver, consisting for example of BCH (31, 21) codes which are a kind of cyclic code, while section Y shows a message signal for conveying message information, consisting, like the selective calling signal, of BCH (31, 21) codes.

Figure 3:
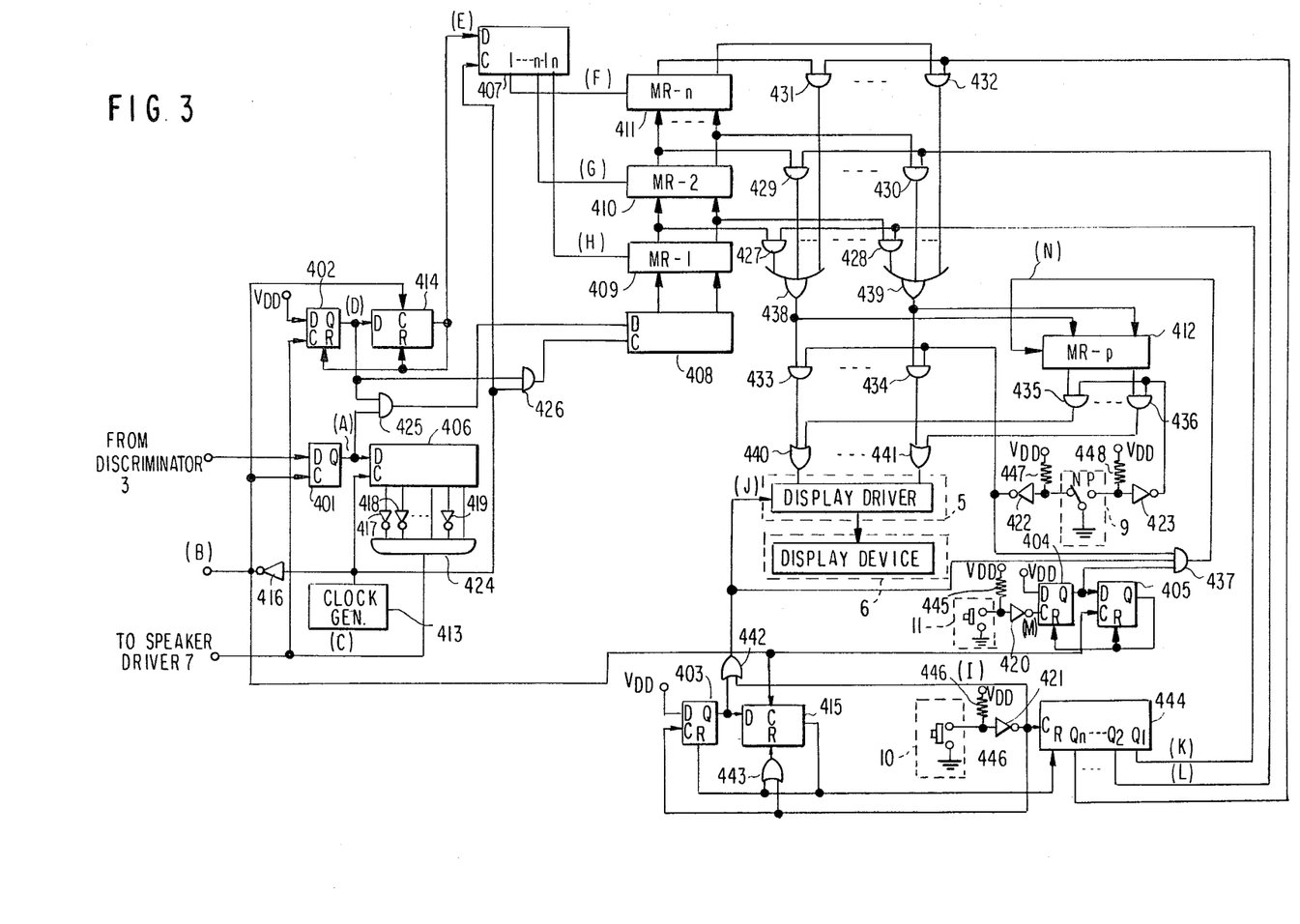
FIG. 3 is a more detailed block diagram of the decoder of the receiver illustrated in FIG. 1.

With reference to FIG. 3, the decoder 4 comprises delay type (D-type) flip-flop 401 to 405, shift registers 406 to 412, a clock pulse generator 413, timers 414 and 415, inverters 416 to 423, AND gates 424 to 437, OR gates 438 to 443, a counter 444 and resistors 445 to 448. To distinguish the shift registers 409 to 412 from other shift registers, the shift register 409 shall be hereinafter called MR-1; 410, MR-2; 411, MR-n and 412, MR-p.

Figure 4:
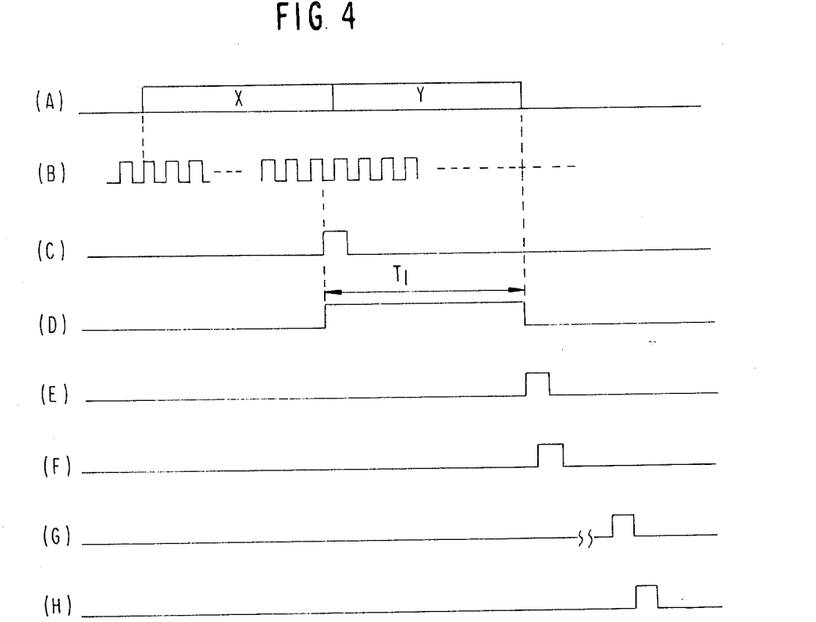
Figure 5:
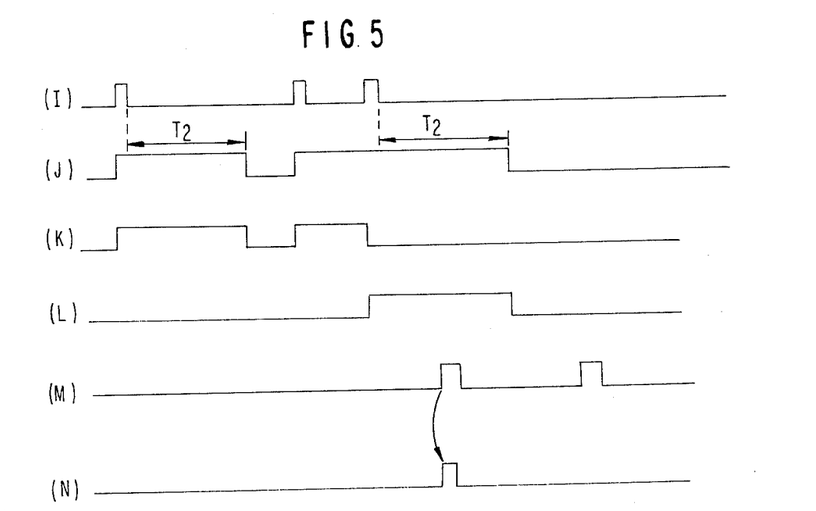

Next, the operation of the decoder illustrated in FIG. 3 will be described in detail with reference to FIGS. 4 and 5. The D-type flip-flop 401 synchronizes the calling signal, demodulated by the discriminator 3 (FIG. 1), with the inverted output (FIG. 4(B)) of the inverter 416 deriving from the output of the clock generator 413, and supplies the synchronized signal to the shift register 406. As a result, if the demodulated signal is found identical with a pattern (the selective calling-signal) predetermined by the inverters 417, 418 and 419, an identity signal (FIG. 4(C)) will be generated from the AND gate 424 and supplied to the speaker driver circuit 7. At the same time, the flip-flop 402 is inverted to drive the timer 414 which has a period of time T1 required for writing the incoming message immediately following the selective calling signal into the register 408 via the AND gates 425 and 426. To the other input of the AND gate 426 is supplied the clock pulse from the clock pulse generator 413.

After the message is completely stored in the shift register 408, the content of shift register MR-n-1 is written into the shift register 411 (MR-n) in response to the output of the shift register 407 which is in response to a reset signal (FIG. 4(E)) from the timer 414. Similarly, the content of the shift register 409 (MR-1) is written into the shift register 410 (MR-2) and so on until the message stored in the shift register 408 is written into the shift register 409 (MR-1) (See FIGS. 4(E), 4(F), 4(G) and 4(H)). Thus, a maximum of n received messages can be stored, and if more than n are received, earlier messages will be erased in the order of their arrival.

Next will be described how the bearer of the receiver can read out one of the stored messages. The display selector switch 9 being turned to the N side, he can press the memory read-out switch 10, and then a signal I shown in FIG. 5(I) will drive the timer 415 through the inverter 421 and the flip-flop 403 to allocate a predetermined display duration T2 (of, e.g., 8 seconds). During T2, a signal J shown in FIG. 5(J) is fed to the display driver circuit 5 to display a message on the display device 6 (which may be, for instance, a liquid crystal device).

If the memory read-out switch 10 is pressed only once, the counter 444 will be actuated via the inverter 421 to start counting and, a signal K shown in FIG. 5(K) being supplied from its Q1 terminal, the AND gates 427 to 428 will be opened. As a result, the content of the shift register 409 (MR-1) is displayed on the display device 6 by way of the OR gates 438 to 439, the AND gates 433 to 434, and the OR gates 440 to 441. Since the display selector switch 9 is turned to the N side, the inverter 422 provides a high level signal to open the AND gates 433 to 434. If, during the display duration T2, the memory read-out switch 10 is pressed once again, the counter 444 will count 2, an output L will emerge at a terminal Q2, and the AND gates 429 to 430 will be opened to display the content of MR-2. As the timer 415 is reset through the OR gate 443, the duration T2 will be renewed (FIG. 5(J)). Here, the outputs of the D-type flip-flop 403 and the inverter 421 are supplied by way of the OR gate 442 to the display driver circuit 5 so that the display driver circuit 5 is kept active even while the memory read-out switch 10 continues to be pressed again and again.

Similarly, if the memory read-out switch 10 is pressed n times, the AND gates 431 to 432 will be opened to display the content of MR-n. If the memory read-out switch 10 is pressed n+1 times, the counter 444 will return to count 1 to display the content of MR-1. Thus, as the memory read-out switch 10 is pressed n times, the messages stored in the shift registers MR-1 to MR-n will be read out in due sequence. When the display duration T2 is over, the display driver circuit 5 is stopped and the counter 444 is reset by a reset signal from the timer 415. Therefore, the next time the memory read-out switch 10 is pressed, the display will again start from MR-1.

Now will be described the procedure by which a specific message is protected from erasure. First the message to be protected is displayed on the display device 6 by the same method as the above described process for simply reading any message, and the memory protect switch 11 is pressed. By that time, the message to be protected will have already been supplied from the OR gates 438 through 439 to the input of the message-protection shift register 412 (MR-p). Upon pressing of the memory protect switch 11, a write-in pulse is generated by the inverter 420 and D-type flip-flops 404 and 405, and is supplied to the shift register 412 (MR-p) by way of the AND gate 437. In this way, the message being displayed is stored in the shift register 412 (MR-p) for protection from erasure.

If the display selector switch 9 is turned to the P side, the AND gates 435 to 436 are opened with the output of the inverter 423, so that the message stored in the shift register 412 (MR-p) is supplied to the display driver circuit 5 through the OR gates 440 to 441. Then, as the memory read-out switch 10 is pressed, the message from the shift register MR-p is displayed on the display device 6. During this procedure, the messages stored in the shift registers MR-1 to MR-n are prevented from going to the display driver circuit 5 by the closure of the AND gates 433 to 434, to which the output of the inverter 422 is fed. When nothing or the content of MR-p is displayed on the display device 6, the memory protection mechanism is prohibited from functioning even if the memory protect switch 11 is pressed. This is done by the AND gate 437. The resistors 445 to 448 are pull-up resistors for securing a high level when the inputs to the inverters 420 to 423 are open. As mentioned above, a message stored in the register MR-p can remain there indefinitely and can be displayed as required unless another message is shifted to the MR-p or the power supply is cut off.

Although the embodiment illustrated in FIGS. 1 and 3 has three switches, i.e., the memory read-out switch 10, the memory protect switch 11 and the display selector switch 9, if it is so rearranged as to enable the protected message to be read out, for instance, by pressing the memory read-out switch 10 n+1 times, the display selector switch 9 can be dispensed with. If, further, a timer is appropriately used, the memory protect switch 11 can also be dispensed with. A version with such a timer will be described next.

Figure 6:
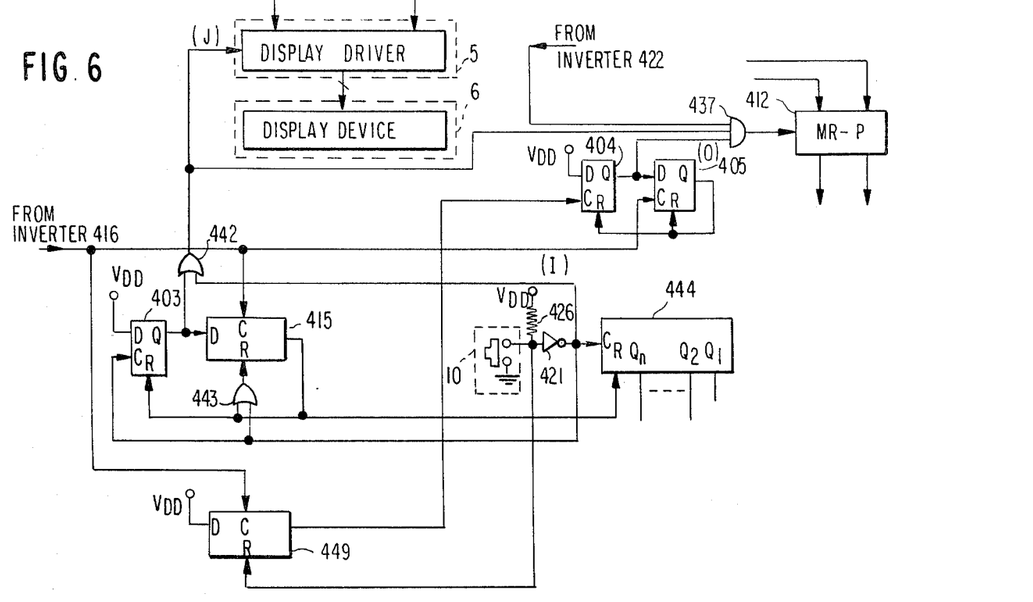
FIG. 6 is a block diagram illustrating a modification of the memory protector section of the decoder illustrated in FIG. 3.
Figure 7:
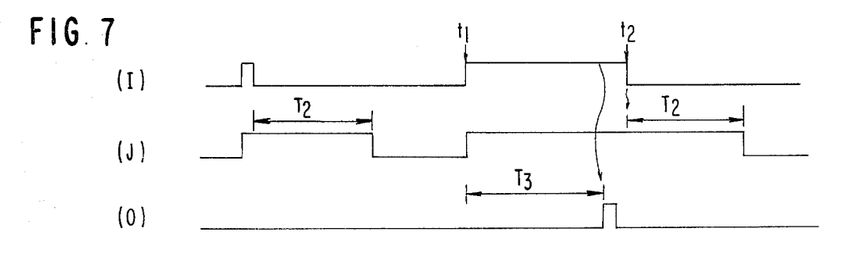
FIG. 7 is a time chart for describing the operation of the memory protector section illustrated in FIG. 6.

In the circuit shown in FIG. 6, a timer 449 is provided to dispense with the switch 11. The functioning of this circuit will be described with reference to FIG. 7. When the memory read-out switch 10 is pressed, the timer 449 starts counting. When the switch 10 has been kept pressed longer than T3 (for instance, between t1 and t2 in FIG. 7(I)), the timer 449 provides a high level signal. In response to this high level signal, the D-type flip-flops 404 and 405 generate a write-in pulse O (FIG. 7(O)) to write into the shift register 412 (MR-p) the message being displayed on the display device 6. Thus, the displayed message is protected by keeping the memory read-out switch 10 pressed for a longer duration than the period T3 timed by the timer 449. If it is further so arranged that the loudspeaker 8 (FIG. 1) be driven to emit a short sound upon generation of the write-in pulse O, greater convenience can be achieved because the bearer of the receiver will thereby confirm that the desired message is duly protected.

Figure 8:
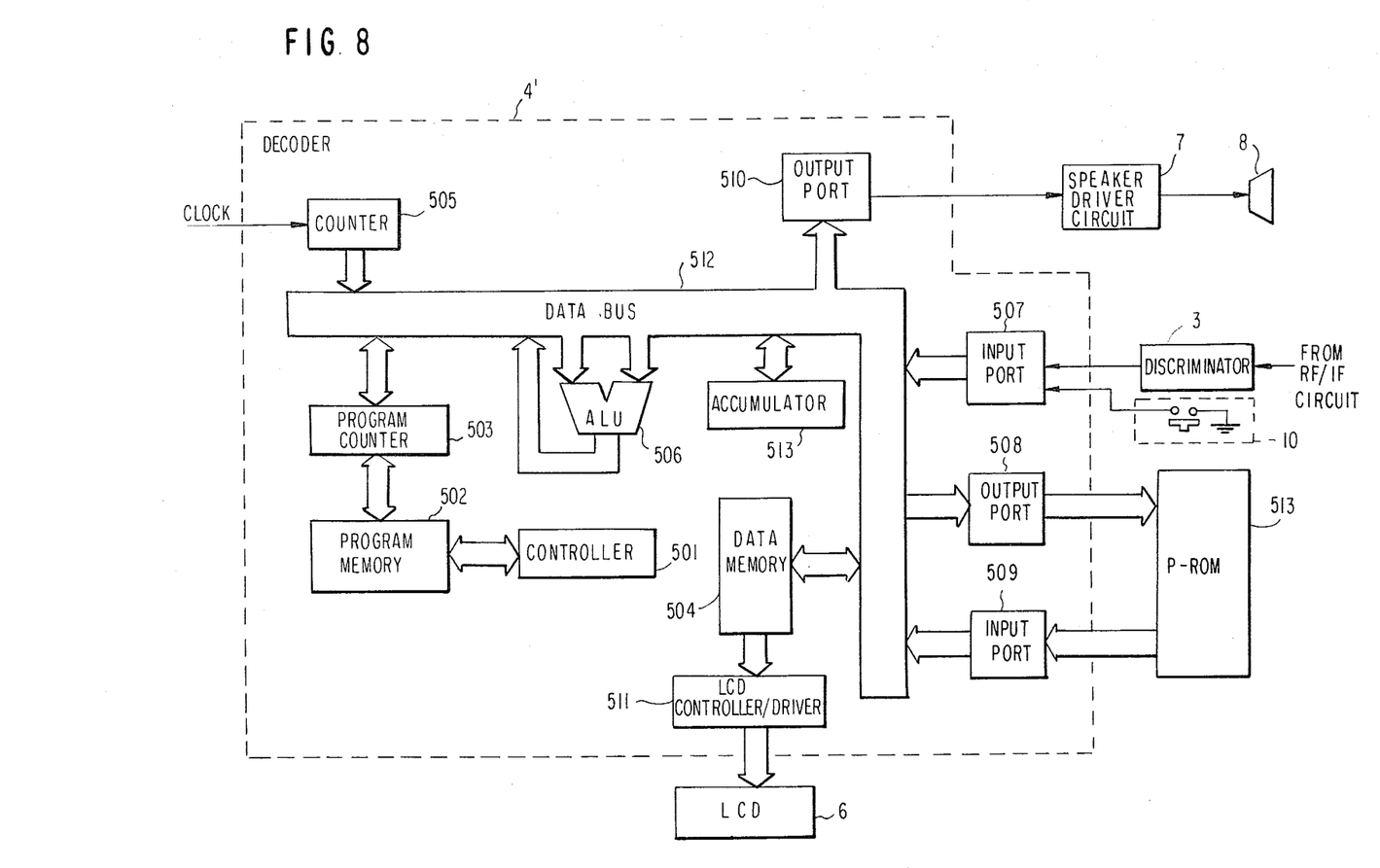
FIG. 8 is a functional block diagram illustrating another embodiment of the decoder of the receiver illustrated in FIG. 1.

Referring now to FIG. 8, a decoder 4' having an LCD controller/driver can use a single-chip control processing unit (CPU), such as the microprocessor μPD7502 manufactured and marketed by the assignee of the present application, Nippon Electric Co., Ltd. A controller 501 decodes command codes to be executed and controls the other blocks to execute the decoded command. In a program memory 502 are stored a group of commands to be executed. A program counter 503 is intended for addressing a program written into the program memory 502. A data memory 504 is provided for temporary storage of messages and the like. Clock pulses required by the decoder 4' are generated by a counter 505 receiving exterior clocks.

An arithmetic and logic unit (ALU) 506 executes arithmetic calculations, results of which are stored in an accumulator 513. The accumulator is also used for data exchange among the memory, input/output ports and registers. An input port 507 is intended for receiving rectangular signals from the discriminator 3 and a read-out signal from the memory read-out switch 10. An output port 508 supplies an address signal for reading out the content of a programmable read-only memory (P-ROM) 513, in which is stored the selective calling signal assigned to the receiver. The signal read out of the P-ROM 513 is brought into the decoder 4' through another input port 509. An alert tone signal is supplied to the speaker driver circuit 7 by way of an output port 510. An LCD controller/driver 511, in response to the supply of data to be displayed from the data memory 504, displays the data on the LCD 6.

Figure 9:
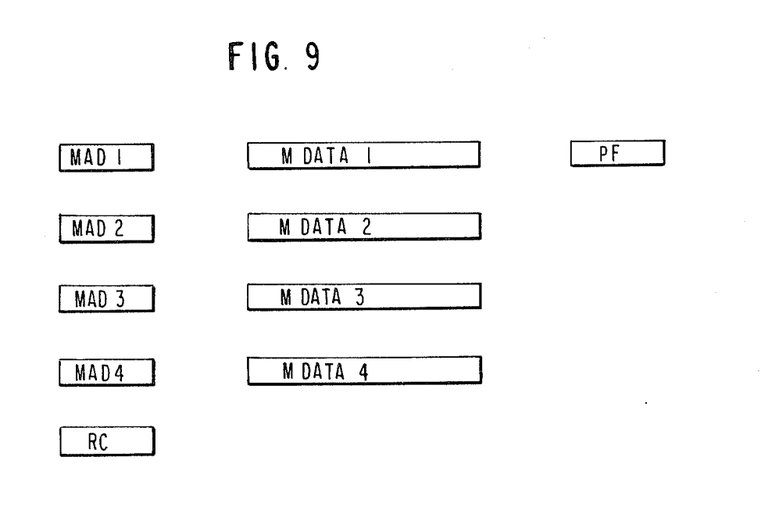
FIG. 9 is a block diagram conceptually illustrating a part of the data memory in the decoder illustrated in FIG. 8.

Referring now to FIG. 9, a part of the data memory 504 includes four message memories MDATA 1 to MDATA 4, memory addresses MAD 1 to MAD 4 for designating one or another of the message memories, a protect flag PF and a read counter RC. If the content of the memory address MAD 1 is, for instance, "1", the message memory MDATA 1 is addressed.

For a detailed description of the CPU shown in FIG. 8, reference is made to the User's Manual of the μPD7502, published by Nippon Electric Co., Ltd., May 23, 1980.

Figure 10:
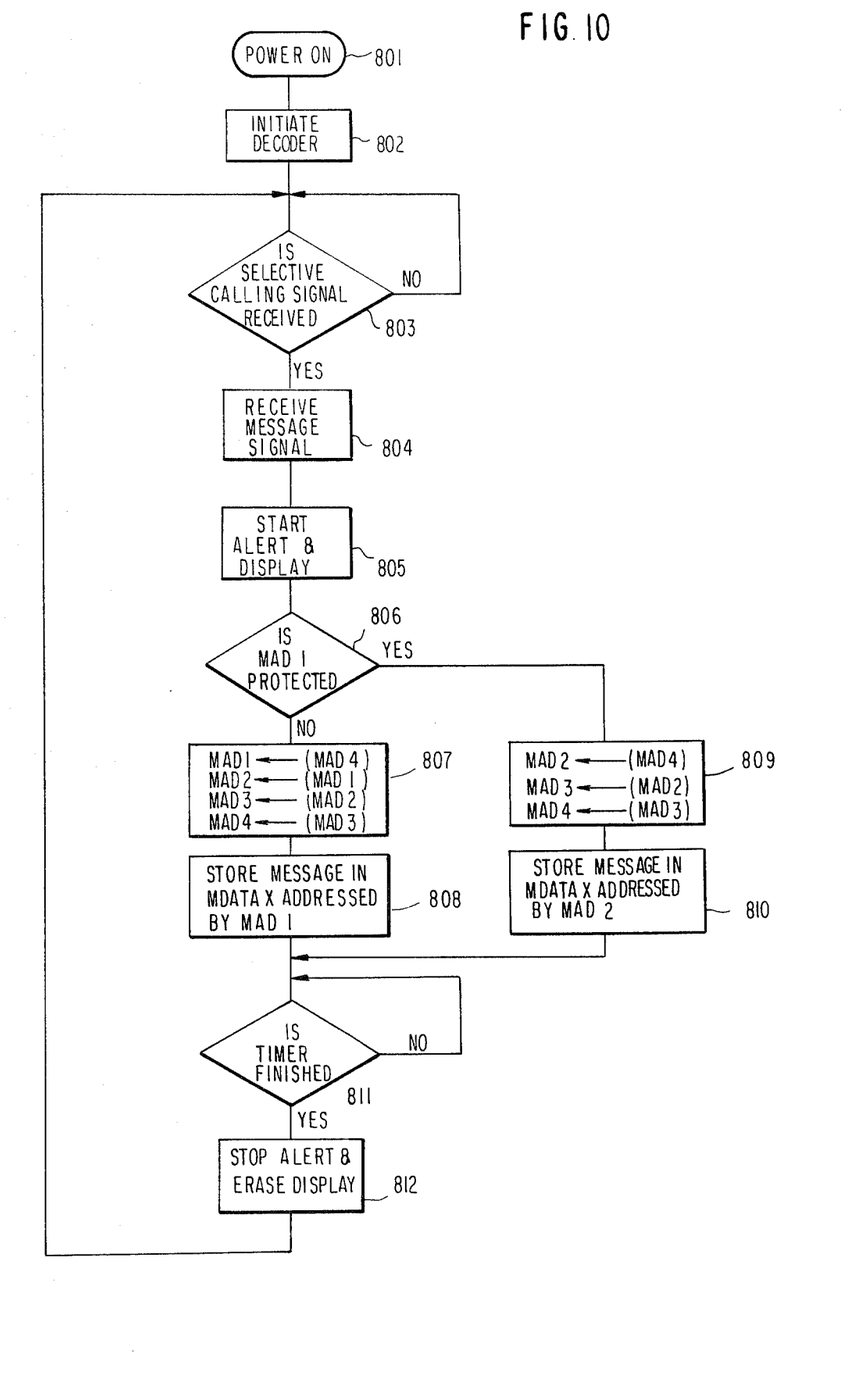
FIGS. 10 and 11 are flow charts respectively showing the calling signal receiving and memory protecting operation of the decoder illustrated in FIG. 8.

Next will be described the calling signal receiving operation and the memory protecting operation of the decoder 4' with reference to the flow charts of FIGS. 10 and 11. In the following description, the step numbers in the flow charts are parenthesized after the respectively corresponding phrases, clauses or sentences. First, referring to FIG. 10, when the power supply is turned on (801), the content of each memory is initially set (802). Into the memory address MAD 1 is entered "4"; into MAD 2, "3"; into MAD 3, "2", and into MAD 4, "1" and the message memories MDATA 1 to 4, the protect flag PF and the read counter RC are all cleared.

After the selective calling signal is received (803), the message is received (804) and simultaneously the alert tone sounding and the display start (805). Then whether or not the memory address MAD 1 is protected is checked (806) and, if it is not, the memory addresses MAD 1 to 4 will be passed forward by one each (807) to have the message memory MDATA x (x=1, 2, 3 or 4) addressed by the memory address MAD 1, store the received message (808). If the memory address MAD 1 is found protected, the memory addresses MAD 2 to 4 will be passed forward by one each (809) to have the message memory MDATA x, addressed by the memory address MAD 2, store the received message and to keep the memory address MAD 1 protected (810). The alert tone and the display will be automatically discontinued (812) after the timer finishes its action (811).

Figure 11:
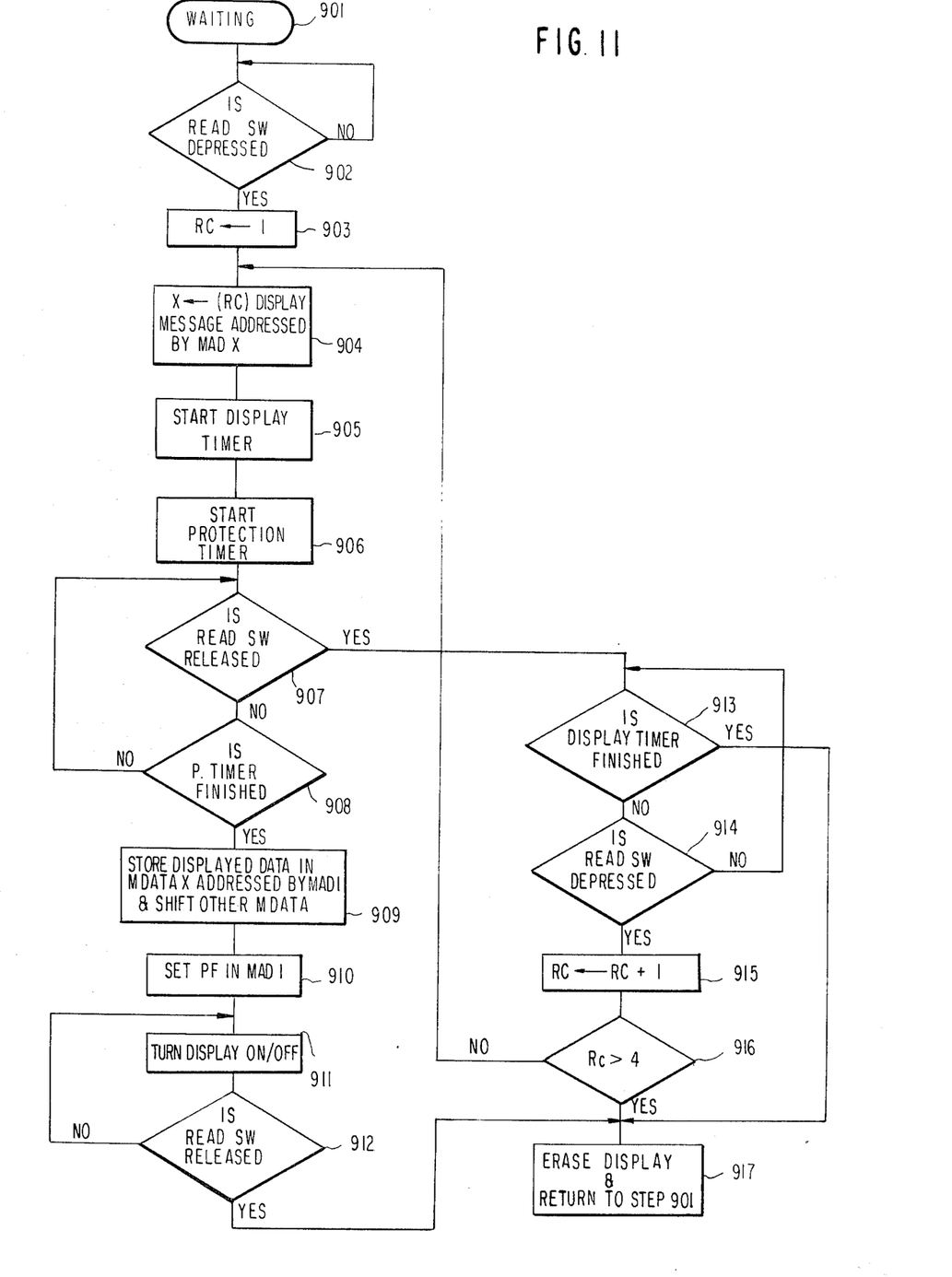

Meanwhile, with reference to FIG. 11, when the receiver is in a waiting mode (901), whether or not the memory readout switch 10 (FIG. 8) has been pressed is constantly checked (902) and, if it is found pressed, either the memory protecting operation or the reading operation will be started. First, the read counter RC is set at "1" (903); the count of the RC is supplied into the x register (904), and the content of the message memory MDATA y (y=1, 2, 3 or 4) addressed by the memory address MAD x is displayed (904). At the same time, the display timer and the protection timer are started (905 and 906, respectively) and, after that, whether or not the read-out switch 10 is released is checked (907).

If the read-out switch is kept pressed until the time (T3) of the protection timer lapses (908), the memory protecting action will then start to have the message memory MDATA x, addressed by the memory address MAD 1, store the data currently displayed and to shift the three other stored messages by one each (909). Thus, if the message at the memory address MAD 3 is protected, the address of this MAD 3 will be shifted into the memory address MAD 1, followed by the shifts of the content of the memory address MAD 1 to the memory address MAD 2 and that of the memory address MAD 2 to the memory address MAD 3. Then, the protect flag PF is set in the memory address MAD 1 (910), and the displayed message is turned on and off (911) to indicate that the displayed message is protected. Upon release of the read-out switch 10, the display is erased, and the receiver will return to its initial waiting mode (912 and 917, respectively).

If the read-out switch 10 is released within the period of time T3 prescribed by the protection timer (907), there will be the routine reading operation: either the display will be continued until the time of the display timer lapses (913) or, if the read-out switch is pressed again (914), the read counter RC will be counted up by 1 (915) and the contents of the message memories can be successively read out until the read counter counts beyond 4 (916). In this arrangement, no special memory is provided for the protective purpose, but a memory addressed by the memory address MAD 1 is used sometimes as an ordinary memory or at other times as a protection memory. In this instance, unlike in the foregoing case where the messages themselves are shifted, only the addresses (MAD 1 to 4) are shifted, and the memory addressed by MAD 1 is either the latest memory or the protected memory.

As is evident from the foregoing description, the present invention enables a radio paging receiver to store important messages without fail and to read them out at any time as required. The present invention, therefore, can greatly contribute to the reliability and economy of the receiver.

What is claimed is:

1. A radio paging receiver comprising:
   means for receiving and demodulating a carrier wave modulated with paging and message signals to provide demodulated paging and message signals;
   means for detecting, out of said demodulated paging signals, the paging signal assigned to said radio paging receiver to provide a detection signal;
   means responsive to said detection signal for generating an alert signal;
   first memory means for storing a plurality of said demodulated message signals;
   second memory means for preventing from erasure and storing at least one of the message signals stored in said first memory means;
   display means for displaying at least one of the message signals stored in said first and second memory means; and
   display control means connected to said first and second memory means and said display means for selectively providing said display means with at least one of the message signals stored in said first and second memory means.

2. A radio paging receiver, as claimed in claim 1, wherein said display control means comprises:
   first switching means for generating a first read-out signal;
   timer means responsive to said first read-out signal for generating a timer signal for a predetermined duration;
   second switching means for generating a write-in signal;
   memory circuit means responsive to said first read-out or timer signal and said write-in signal for storing at least one of the contents stored in said first memory means;
   third switching means for generating a second read-out signal;
   means responsive to said first read-out signal for providing said display means with at least one of the message signals stored in said first memory means; and
   means responsive to said first and second read-out signals for providing said display means with said message signal stored in said second memory means.

3. A radio paging receiver, as claimed in claim 1, wherein said display control means comprises:
   first switching means for generating first and second read-out signals;
   first timer means responsive to said first read-out signal for generating a first timer signal for a first predetermined duration;
   second timer means responsive to said first read-out signal for generating a second time signal for a second predetermined duration;
   memory circuit means responsive to said first read-out or first timer signal and said second timer signal for storing in said second memory means at least one of the contents stored in said first memory means;
   means responsive to said first read-out signal for providing said display with at least one of the message signals stored in said first memory means; and
   means responsive to said second read-out signal for providing said display means with said message signal stored in said second memory means.

4. A radio paging receiver, as claimed in claim 1, wherein said detecting means, first and second memory means and display control means are formed in a single-chip micro-processor.

5. A radio paging receiver of the type comprising receiving means receiving means for receiving and demodulating message signals, first memory means for storing a plurality of said demodulated messages and display means for displaying messages stored in said first memory, said first memory including a plurality of memory locations for storing respective ones of said plurality of messages and, upon receiving a further message to be stored when all of said memory locations are full, automatically erasing a message from at least one of said memory locations to make room for said further message, said receiver further comprising protection means for ensuring that at least one of said stored messages will continue to be stored in said receiver regardless of how many messages are received for storage in said first memory.

6. A radio paging receiver as claimed in claim 5, wherein said protection means comprises a further memory location, in addition to said plurality of memory locations, for storing said protected message.

7. A radio paging receiver as claimed in claim 6, wherein said protection means further comprises selection means for selectively providing any one of said plurality of stored messages to said further memory location for storage therein.

8. A radio paging receiver as claimed in claim 6, further comprising display selection means for selectively providing to said display means any one of said plurality of messages from one of said plurality of memory locations, or said protected message from said further memory location.

9. A radio paging receiver as claimed in claim 8, wherein said display selection means comprises address generating means for selectively generating a plurality of memory addresses, at least one of said memory addresses corresponding to said further memory location and the remainder of said memory addresses corresponding to respective ones of said plurality of memory locations.

10. A radio paging receiver as claimed in claim 8, wherein said display selection means comprises address means for generating a plurality of addresses corresponding to respective ones of said plurality of memory locations, means responsive to a generated address for providing as an output the message stored in the designated memory location, means for providing said output to said display means in response to a first enabling signal, means for providing the contents of said further memory location to said display means in response to a second enabling signal, and means (9) for selectively generating non-overlapping enabling signals.

* * * * *